United States Patent
Eriksen et al.

(10) Patent No.: US 9,638,019 B2
(45) Date of Patent: May 2, 2017

(54) OFFSHORE PROCESSING METHOD AND SYSTEM

(71) Applicant: FMC Kongsberg Subsea AS, Kongsberg (NO)

(72) Inventors: Steinar Eriksen, Hokksund (NO); Bodil Iren Hop, Heggedal (NO); Torbjørn Ruud, Heggedal (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 158 days.

(21) Appl. No.: 14/380,718

(22) PCT Filed: Feb. 21, 2013

(86) PCT No.: PCT/EP2013/053411
§ 371 (c)(1),
(2) Date: Aug. 23, 2014

(87) PCT Pub. No.: WO2013/124336
PCT Pub. Date: Aug. 29, 2013

(65) Prior Publication Data
US 2015/0013539 A1    Jan. 15, 2015

(30) Foreign Application Priority Data

Feb. 23, 2012  (NO) .................................. 20120190
Feb. 23, 2012  (NO) .................................. 20120195

(51) Int. Cl.
*E21B 43/36* (2006.01)
*C10L 3/10* (2006.01)
(Continued)

(52) U.S. Cl.
CPC .......... *E21B 43/36* (2013.01); *B01D 53/1425* (2013.01); *B01D 53/1456* (2013.01);
(Continued)

(58) Field of Classification Search
CPC ...... E21B 43/36; E21B 41/0007; E21B 43/01; B01D 53/1425; B01D 53/1406;
(Continued)

(56) References Cited

U.S. PATENT DOCUMENTS 3,495,380 A * 2/1970 Goldman ............... B01D 53/26
188/181 A
4,239,510 A * 12/1980 Hays .................. B01D 53/1475
166/267

(Continued)

FOREIGN PATENT DOCUMENTS

FR     2 618 876 A1     2/1989
GB       2404684 A  *  2/2005 ........... E21B 43/017
(Continued)

OTHER PUBLICATIONS

Stunkel et al. "Carbon dioxide capture for the oxidative coupling of methane process—A case study in mini-plant scale" Chemical Engineering Research and Design published 2011.*

*Primary Examiner* — Amber R Orlando
*Assistant Examiner* — Stephen Hobson

(57) ABSTRACT

A method for removal of a compound from a crude hydrocarbon gas stream to be obtained from a sub-sea well is disclosed. The method comprises bringing the crude hydrocarbon gas stream in contact with a treatment solution comprising an absorbent at least partly selective to the compound to be removed, thereby obtaining a rich treatment solution and a compound depleted gas stream, regenerating the treatment solution comprising the absorbent by desorbing the compound from the rich treatment solution, thereby obtaining a compound stream. The crude hydrocarbon gas stream is brought in contact with the treatment solution comprising the absorbent subsea, the compound depleted gas stream is obtained subsea, where as the regenerating of the rich treatment solution and obtaining the compound stream is performed topside Further a system for transporting a treatment fluid from a subsea treatment unit to a
(Continued)

topside regeneration involving adding pressurized hot natural gas to the treatment fluid subsea as a lift gas and separating the natural gas from the treatment fluid topside before the treatment fluid enters the treatment unit is described.

5 Claims, 5 Drawing Sheets

(51) Int. Cl.
    *E21B 43/01*     (2006.01)
    *E21B 41/00*     (2006.01)
    *B01D 53/14*     (2006.01)
    *B01D 53/26*     (2006.01)

(52) U.S. Cl.
    CPC ..... *B01D 53/1475* (2013.01); *B01D 53/1481* (2013.01); *B01D 53/1493* (2013.01); *C10L 3/102* (2013.01); *E21B 43/01* (2013.01); *B01D 53/1406* (2013.01); *B01D 53/1462* (2013.01); *B01D 53/263* (2013.01); *B01D 2252/204* (2013.01); *B01D 2252/2023* (2013.01); *B01D 2256/24* (2013.01); *B01D 2257/304* (2013.01); *B01D 2257/504* (2013.01); *E21B 41/0007* (2013.01); *Y02C 10/06* (2013.01)

(58) Field of Classification Search
    CPC ............ B01D 53/1481; B01D 53/1493; B01D 53/1456; B01D 53/1475; B01D 53/263; B01D 53/1462; B01D 2252/2023; B01D 2252/204; B01D 2256/24; B01D 2257/304; B01D 2257/504; C10L 3/102; Y02C 10/06
See application file for complete search history.

(56) References Cited

U.S. PATENT DOCUMENTS

| | | | | |
|---|---|---|---|---|
| 4,948,394 | A * | 8/1990 | Rojey | E21B 43/34 95/188 |
| 2003/0159581 | A1* | 8/2003 | Sanderford | E21B 43/36 95/243 |
| 2008/0190291 | A1* | 8/2008 | Krehbiel | B01D 17/02 95/241 |
| 2012/0285656 | A1* | 11/2012 | Moore | F25J 1/0022 165/45 |
| 2013/0142717 | A1* | 6/2013 | Siskin | C10L 3/103 423/228 |
| 2013/0312614 | A1* | 11/2013 | Zainal Abidin | B01D 17/0211 96/242 |
| 2015/0021235 | A1* | 1/2015 | Eriksen | E21B 43/36 208/187 |
| 2015/0075375 | A1* | 3/2015 | Blount | B01D 53/1406 95/177 |
| 2015/0083425 | A1* | 3/2015 | Sullivan | B01D 53/18 166/305.1 |
| 2015/0090117 | A1* | 4/2015 | Baggerud | B01D 53/22 95/30 |
| 2015/0135954 | A1* | 5/2015 | Li | C07C 31/202 95/193 |
| 2015/0240605 | A1* | 8/2015 | Vu | E21B 43/0122 405/64 |

FOREIGN PATENT DOCUMENTS

| | | | | |
|---|---|---|---|---|
| NO | WO 0183947 | A1 * | 11/2001 | ............ E21B 43/34 |
| NO | WO 02063135 | A1 * | 8/2002 | |
| NO | WO 2013136310 | A1 * | 9/2013 | ......... B01D 53/1406 |

* cited by examiner

OFFSHORE PROCESSING METHOD AND SYSTEM

The present invention relates to an offshore processing method and system, especially an offshore processing method where a treatment solution is employed for separation of a component from a main fluid stream, Further, the present invention relates to a method and a system where a fluid stream is transported from a subsea arranged installation to a topside installation without the use of a pump.

BACKGROUND OF THE INVENTION

Crude process fluid extracted from a well is initially separated into a crude natural gas stream and one or more liquid streams. The crude natural gas stream will usually contain acid compounds such as carbon dioxide and hydrogen sulphide as well as being saturated with water. The acid compounds can together with condensed water form liquid acid during handling and transport which may result in corrosion unless all equipment is made of high quality and high cost steel. Further, the presence of water in the natural gas can during temperature and pressure changes result in the formation of solid hydrates that may result in blockage of the passages through the equipment.

The exploitation of subsea wells has gone through considerable developments since the start of the offshore era. The location of the wells has changed both with respect to sea depth as well as distance to shore. This has resulted in new systems for handling the well streams. One such system includes a subsea installation near the wellhead combined with a topside platform, which can be a floating processing platform. Transportation of the well products can take place either through subsea pipelines or via tanker transport. Due to the limited space on a floating platform, generally the amount of process equipment needs to be adjusted to the available. space. One offshore processing method includes letting a major part of the hydrocarbon gas handling take place sub-sea but handling some regeneration processes and side streams topside.

The well fluid from a subsea well will normally naturally have sufficient pressure to proceed from the subsea well head and up to a topside arranged installation.

However, the subsea processing steps will often result in loss of pressure, as the different separation and treatment processes cannot be performed at such high pressures. After treatment the produced stream as well as the treatment solutions employed subsea will no longer have sufficient pressure for transportation to the topside installation. To facilitate transport of the fluids pumps are installed subsea. Power to the pumps is provided from the top side installation. At high sea depths the power demand would be considerable, which requires a considerable power plant on the top side installation and increased dimensions for the power cable and the length thereof.

PRIOR ART

Accordingly, it is well known to pass the crude natural gas through different separation processes to remove add compounds, water and or other compounds to obtain a natural gas stream ready for export.

Conventionally, when natural gas is recovered from a subsea well the well stream is either transported to a topside facility as is or an initial phase separation takes place subsea before the gas and/or oil is transported to a topside facility for further treatment prior to export.

Known processes for removal of acid compounds/$CO_2$ and water include separate absorption processes where the crude gas is brought in contact with a selective absorbent solution. After contact with the absorbent solution a gas stream depleted from the compound absorbed in the absorbent solution is obtained. To remove more compounds or groups of compounds the crude gas stream may be passed through a series of contactors employing similar or different absorbent solutions.

The different absorbent solutions including the selective absorbents usually have a significant cost and for environmental reasons require special treatment. For these and other reasons the absorbent solutions are normally regenerated for reuse in the absorption process. The regeneration is normally performed by heating and/or depressurization of the rich absorption solution in a desorber, resulting in desorption of the absorbed compound from the solution. The solution is separated from the desorbed gas and cooled before being reused. The desorption and regeneration process is demanding both with respect to energy, mainly for heating, and with respect to structural space.

For subsea wells the treatment processes are presently being performed topside, which requires that all the gas be brought up to the surface and that all the process equipment be installed topside, including absorbers, desorbers, tanks for the treatment solutions, etc. Due to the fact that the topside facility is handling all the produced natural gas, significant security requirements must be fulfilled. The hazard risks are initially significant when inflammable gas is handled and the security requirements must be in place to lower the risk. This increases the size and the complexity of the topside facility.

The topside facility can be a floating platform or ship like construction or it can be a rig construction with one or more legs fixed to the ground subsea.

Disclosed solutions for subsea pumps comprise different techniques for handling the external pressure and the corrosive environment. For gas streams subsea compressors are provided to facilitate compact transport of the gas stream. Presently there exist compressors which work effectively under subsea conditions.

SUMMARY OF THE INVENTION

The objective of the present invention is to provide an alternative method and system for gas treatment which impose fewer requirements on the topside facility, without significantly increasing the complexity of the system.

The present invention provides a method for removal of a compound from a crude hydrocarbon gas stream obtained from a sub-sea well, wherein the method comprises bringing the crude hydrocarbon gas stream in contact with a treatment solution comprising an absorbent at least partly selective to the compound to be removed, thereby obtaining a rich treatment solution and a compound depleted gas stream, regenerating the treatment solution comprising the absorbent by desorbing the compound from the rich treatment solution, thereby obtaining a compound stream, wherein the crude hydrocarbon gas stream is brought in contact with the treatment solution comprising the absorbent subsea and the compound depleted gas stream is obtained subsea, whereas the regenerating of the rich treatment solution to obtain the compound stream is performed topside.

In another aspect the method comprises transporting the compound rich treatment solution from subsea to topside and transporting the treatment solution comprising the absorbent from topside to subsea.

In yet another aspect the method comprises heat exchanging the rich treatment solution with the treatment solution comprising the absorbent during transporting.

In a further aspect the method comprises inline mixing of the crude natural gas and the treatment solution comprising the absorbent.

In yet another aspect the method comprises bringing the crude natural gas and the treatment solution comprising the absorbent in contact in a counter current contactor column.

In a first aspect of the method according to the present invention the compound to be removed is $CO_2$ and optionally $H_2S$. According to this first aspect the obtained compound stream will comprise mainly $CO_2$, and this stream is further pressurized and reinjected subsea. According to this first aspect of the invention the treatment solution comprising the absorbent comprises a $CO_2$ absorbent. The absorbent can be freely selected among available $CO_2$ absorbents. In a further aspect of this first aspect of the invention the treatment solution is an aqueous amine solution.

In second aspect of the present invention the compound to be removed is $H_2O$. According to this second aspect of the invention the treatment solution comprising the absorbent comprises a $H_2O$ absorbent. The absorbent can be freely selected among available $H_2O$ absorbents. In a further aspect of this second aspect of the present invention the treatment solution comprising the absorbent is a glycol solution. Further according to this second aspect of the invention the obtained compound stream mainly comprises $H_2O$ vapor, which can be released to atmosphere.

In a further aspect the method according to the present invention comprises firstly performing the method according to the first aspect and thereafter performing the method according to the second aspect on the $CO_2$ depleted gas obtained by performing the method according to the first aspect.

Further the present invention provides a crude natural gas treatment system for removal of a compound from a crude natural gas stream comprising an absorption unit with a natural gas inlet, a treatment solution inlet, a compound depleted gas outlet and a rich treatment solution outlet and comprising a desorption unit with a rich treatment solution inlet, a compound outlet and a depleted treatment solution outlet, where the rich treatment solution outlet is in fluid communication with the rich treatment solution inlet and the depleted treatment solution outlet is in fluid communication with the treatment solution inlet, wherein the absorption unit is arranged subsea and the desorption unit is arranged topside.

In one aspect of the system according to the present invention the system comprises a heat exchanger for heat exchanging the rich treatment solution with the depleted treatment solution. In one embodiment according to the aspect of the system the heat exchanger is a pipe-in-pipe riser. In an advantageous embodiment the pipe-in-pipe riser comprises an inner pipe in fluid communication with the depleted treatment solution outlet topside and the treatment solution inlet subsea, and an outer pipe in fluid communication with the rich treatment solution outlet subsea and the rich treatment solution inlet topside.

In another aspect of the system the absorption unit comprises an in-line mixing device and/or a contactor column.

In a further aspect the system further comprises a second absorption unit with a second natural gas inlet, a second treatment solution inlet, a second compound depleted gas outlet and a second rich treatment solution outlet; and a second desorption unit with a second rich treatment solution inlet, a second compound outlet and a second depleted treatment solution outlet, where the second natural gas net is in fluid communication with the compound depleted gas outlet, the second rich treatment solution outlet is in fluid communication with the second rich treatment solution inlet, and the second depleted treatment solution outlet is in fluid communication with the second treatment solution inlet, and where the second absorption unit is arranged subsea and the second desorption unit is arranged topside.

In one aspect of the system according to the further aspect of the system according to the present invention the first compound is $CO_2$, the absorption unit is a $CO_2$ absorber, the second compound is $H_2O$ and the second absorber is a dehydrator.

According to the present invention a major part of the hydrocarbon gas handling takes place sub-sea, but some regeneration processes and side streams are handled top side.

As there are in this solution fluids that are transported between topside and subsea facilities, dependent on the water depth and the process pressure subsea, one may make use of the differences in operating pressures subsea and topside to reduce or possibly eliminate the need for additional pressure increasing/decreasing devices such as pumps/chokes/lift gas systems, etc. in the system. The hydraulic head and transportation in itself will assist in the pressure increase and decrease of the fluids that are transported between subsea and topside.

A further object of the present invention is thus to provide an alternative way of providing pressure to a treatment fluid or other liquid stream employed subsea, where the streams need to be transported to topside for regeneration or further processing.

Another object is to provide a process which at the same time as it provides pressure for transport assists during transport in the separation of a rich treatment fluid.

Additionally it is goal to provide a system which supplies fuel to a topside fuel gas system.

The present invention provides a method for transporting a treatment fluid from a subsea treatment unit to a topside regeneration unit, wherein the method comprises adding pressurized natural gas to the treatment fluid subsea as a lift gas and separating the natural gas from the treatment fluid topside before the treatment fluid enters the treatment unit. The added pressurized natural gas will normally be hot at the prevailing conditions. The term "hot" as used here refers to at a temperature above the temperature of the treatment fluid, as the pressurized gas is heated during the compression.

In one aspect of the method according to the present invention the topside separation of the natural gas is performed by flashing of the natural gas from the treatment fluid.

In another aspect of the method according to the present invention, the subsea treatment unit is a $CO_2$ absorber unit and the treatment fluid is $CO_2$ rich absorption solution which is regenerated topside to $CO_2$ lean absorption solution.

In a further aspect of the method according to the present invention the subsea treatment unit is a $H_2O$ removal unit and the treatment fluid is $H_2O$ rich absorption solution which is regenerated topside to $H_2O$ lean absorption solution.

In yet another aspect of the method according to the present invention the separated natural gas is fed to a topside power generating system.

In an additional aspect of the method according to the present invention the natural gas used as lift gas is obtained by pressurization of crude natural gas treated by at least one treatment unit.

Further, the present invention provides a treatment fluid transporting system comprising a subsea treatment Ina with a treatment fluid outlet, a subsea arranged compressor with a natural gas inlet and a pressurized natural gas outlet, a riser with a subsea riser inlet and a topside riser outlet, where the riser inlet is in fluid communication with the treatment fluid outlet and with the pressurized natural gas outlet.

In one aspect of the system according to the present invention the system further comprises a topside flash separation unit with an inlet in fluid communication with the riser outlet, a gas outlet and a treatment fluid outlet.

In a further aspect the system comprises a topside power generating system with a fuel inlet in fluid communication with the gas outlet from the flash separator and a treatment fluid regeneration unit in fluid communication with the treatment fluid outlet from the flash separator.

In yet another aspect of the system according to the present invention the treatment unit is a $CO_2$ absorption unit or a $H_2O$ absorption unit and the treatment fluid is the respective rich absorption fluid.

The term "topside" as used here refers to a position in proximity of the sea level. For floating topside installations, part of the equipment may be installed above or below the sea level but within or on the floating vessel or platform. For platforms with one or more legs connected to the seabed the term "topside" should be interpreted to refer to any position on the platform above sea level.

BRIEF DESCRIPTION OF THE DRAWINGS

The present invention will be discussed in further detail with reference to the enclosed figures where.

DETAILED DESCRIPTION OF THE INVENTION

The figures illustrate different embodiments of the present invention. The same reference numbers are used to refer to equal elements within the different embodiments. It should be understood that features of the different embodiments may be combined to provide additional embodiments of the present invention.

Figure 1:
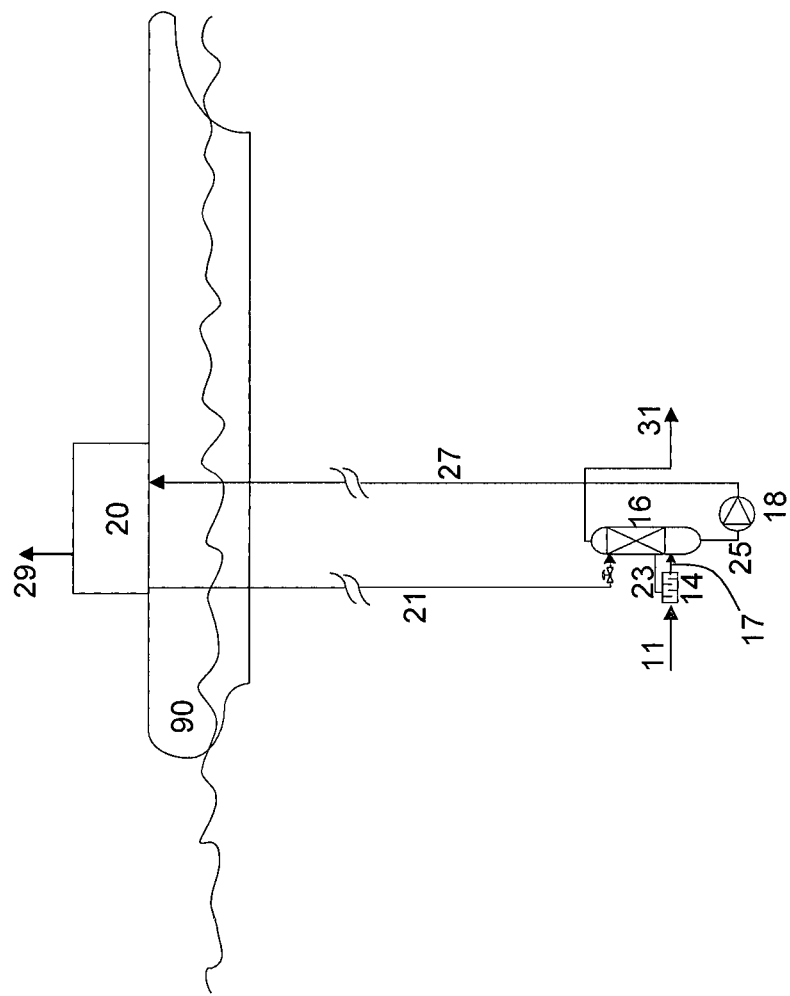
FIG. 1 schematically illustrates a first embodiment of the present invention.

FIG. 1 illustrates how, according to the present invention, a crude gas stream 11 comprising a compound to be removed is fed to a contactor system 14, 16 arranged subsea. In the illustrated embodiment the contactor system is a two stage process with an Initial direct contactor (mixer device) 14 and a traditional contactor column 16. However, the present invention is not limited to this embodiment; any contactor system applicable for subsea arrangement may be employed. In the direct contactor 14 the gas stream is brought in contact with a treatment solution stream fed through pipe 23. The obtained gas treatment solution mixture proceeds as stream 17 into the contactor column 16. Lean treatment solution is provided to the column from pipe 21. In the illustrated embodiment the treatment solution for the direct contactor is obtained from the column 16 at a level above the gas inlet; however, the present invention is not limited to this solution, as lean treatment solution could also be fed to the direct contactor as well as the column. The treatment solution comprises one or more species that at least with some selectivity absorb the compound to be removed from the crude gas stream. A species and solvent/diluent applicable for forming an effective treatment solution can be selected by the user depending on the compound to be removed and the prevailing conditions within the system. During contact with the treatment solution the compound to be removed is absorbed in the solution. The crude gas accordingly at least partly depleted from the compound to be removed leaves the system over the top of the column trough pipeline 31. The main crude gas stream accordingly stays subsea during the treatment process. The rich treatment solution leaves the contactor 16 through the bottom outlet pipeline 25. in the illustrated embodiment a pump 18 is provided to force the rich treatment solution to proceed up through the riser or pipeline 27. The is only an illustration of one possible way of securing transport of the rich treatment solution up through the pipeline 27; other methods of providing the needed pressure and flow can equally be employed. On a topside facility 90 a regeneration system 20 is installed. The system receives the rich solution from pipeline 27, desorbs and separates the absorbed compound therefrom, and obtains a depleted treatment solution which is sent back to the subsea contactor system through pipeline/riser 21. The desorbed compound leaves the regeneration unit 20 as stream 29.

In one aspect of the present invention the compound to be removed is an acid gas, such as $CO_2$ and/or $H_2S$ and the treatment solution comprises an amine based $CO_2$ absorbent. In another embodiment the compound to be removed from the gas is water, and the treatment solution is water absorbent such as tri ethylene glycol or another glycol based water absorbing compound.

Figure 2:
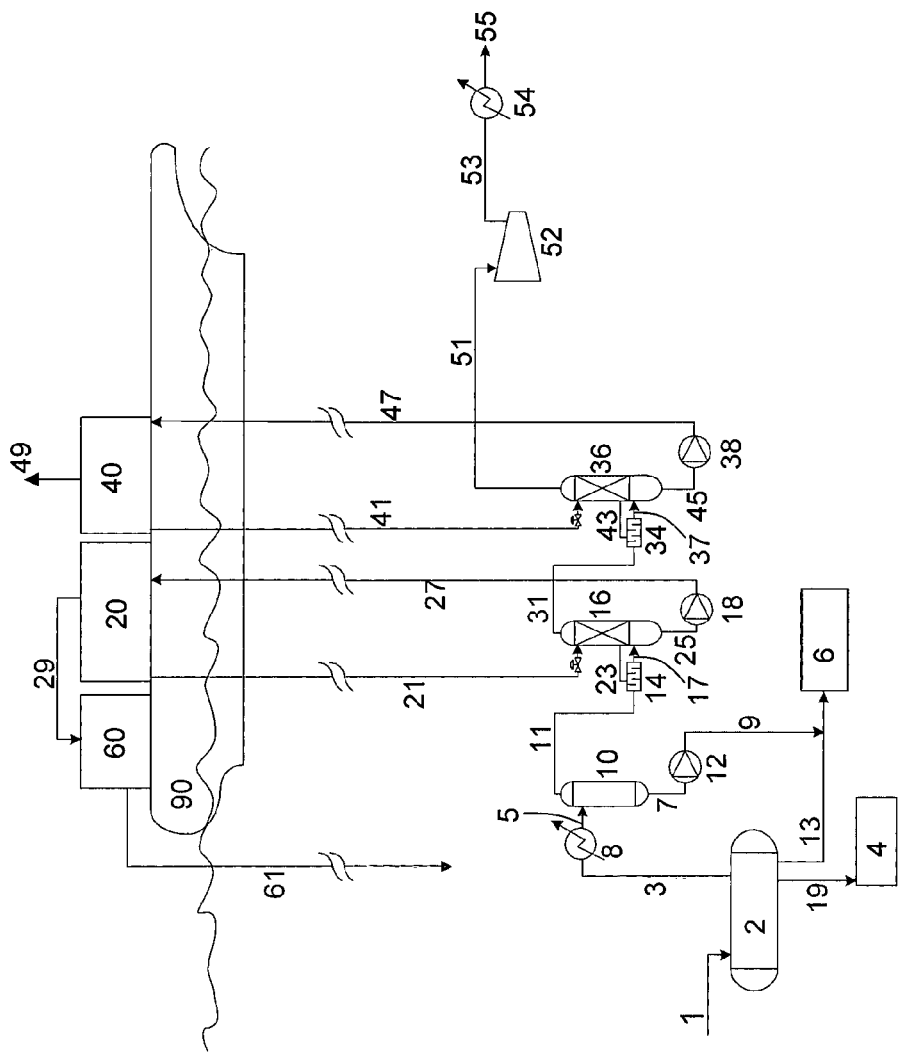
FIG. 2 illustrates the process scheme of a second embodiment of the present invention.

FIG. 2 illustrates a further embodiment of the present invention. Illustrated here is also the initial treatment of a well fluid 1. Firstly the well fluid 1 enters a phase separator 2, where the gas stream 3 is separated from the liquid. In the illustrated embodiment a water stream 19 is passed to a produced water treatment system 4, and the oil stream 13 is past to an oil treatment system 6. The gas 3 is initially cooled by cooler 8 to obtain cooled gas 5. The cooling results in condensation of higher hydrocarbons which are separated in separator 10. The liquid stream 7 is via pump 12 and pipe 9 mixed with the main oil stream from the separator 2. The gas 11 leaving over the top of the separator 10 is subject to a system and treatment as discussed in connection with FIG. 1. The obtained treated gas 31 enters a second system according to the present invention comprising a direct contactor 34, where it is brought in contact with a treatment solution stream 43. The obtained mixture is fed to a contactor column 36. The rich treatment solution leaves via the bottom as stream 45, via pump 38 and is transported via pipeline 47 to a top side installation 90 and a regeneration unit 40. Here the compound absorbed in the rich treatment solution is released resulting in a compound stream 49 and a lean treatment solution 41 being returned to the subsea contactor 36.

The treated gas stream 51 leaving over the top of contactor column 36 can be compressed in compressor 52 and the temperature of the compressed gas 53 controlled by heat exchanger 54, thereby providing a treated gas stream 55 adjusted for subsea pipeline transport.

In one embodiment of the present invention $CO_2$ is removed in the first contactor 16 and water is removed from the gas in the second contactor 36, whereby the obtained gas is sweetened and dewpointed to allow for pipe line transport. The $CO_2$ 29 released from the treatment solution 27 within the unit 20 is then in this embodiment transferred to a $CO_2$ injection system 60 where it is compressed or otherwise prepared for injection via line 61. The gas stream 31 is a sweet gas stream. Water present in the gas is absorbed in the treatment solution 47. The removed compound in stream 49 is water and this stream can be released to the atmosphere. The gas stream 51 is sweet and dry and as such is conditioned for transport.

Figure 3:
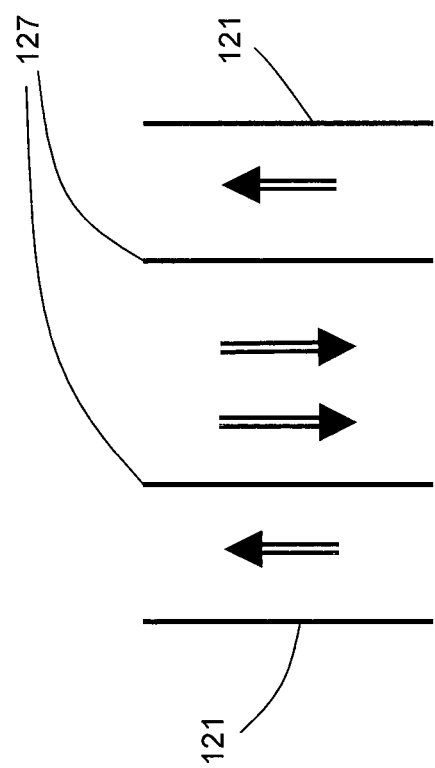
FIG. 3 illustrates a cross sectional view in the longitudinal direction of an embodiment of the riser/pipeline.

FIG. 3 illustrates a pipeline configuration forming an aspect of the present invention, Here the pipelines 121 and 127 correspond to the pipe lines 21 and 27 in FIG. 1, but arranged as a pipe-in-pipe riser. In the illustrated embodiment the inner pipe 127 of the two concentric pipes transports the lean treatment solution, whereas the outer pipe 121 of the two concentric pipes transports the rich treatment solution. The topside regeneration of the treatment solution normally involves supplying heat to the solution to release the absorbed compound. The pipe-in-pipe arrangement allows for heat transfer from the warm lean treatment solution to the rich treatment solution and thereby provides a more energy efficient process as well as reduces the number of connections between the subsea installation and the topside facility.

Figure 4:
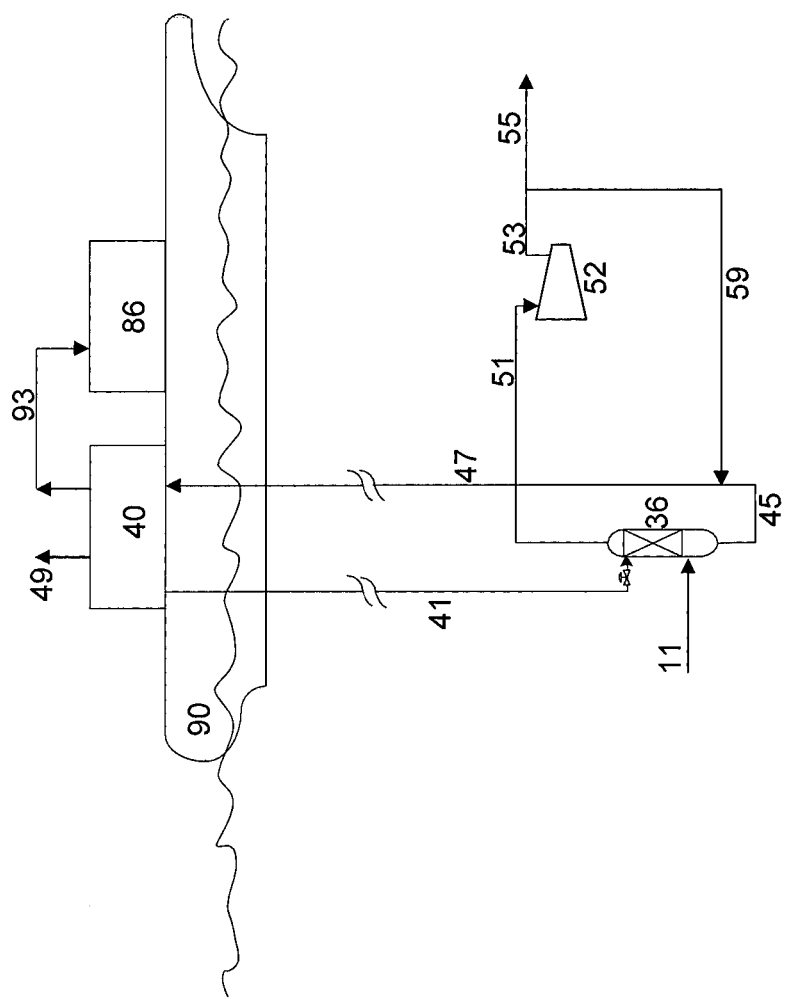
FIG. 4 schematically illustrates an embodiment of the present invention with an alternative way of providing pressure to a treatment fluid or other liquid stream employed subsea where said stream needs to be transported to topside.

FIG. 4 illustrates an embodiment of the present invention with an alternative way of providing pressure to a treatment fluid or other liquid stream employed subsea where said stream needs to be transported to topside. A subsea stream 11 is fed to a treatment column 36, where the stream 11 is brought in contact with a treatment fluid 41. In one embodiment the stream 11 may be a natural gas stream and the treatment fluid an absorbent for absorbing a compound to be removed from the natural gas stream. The bottom stream 45 leaving the column will be a rich treatment solution. The natural gas with a reduced content of the compound to be removed leaves over the top as stream 51. The gas is fed to a subsea compressor 52 to obtain compressed, depleted natural gas 53. A part 55 of the compressed, depleted natural gas proceeds to shore, storage or further processing. Another part 59 of the compressed gas is injected into the rich treatment solution 45, thereby providing sufficient pressure for the rich treatment solution to be transported through riser 47 to a topside installation 90.

The top side installation 90 comprises a treatment solution regeneration system 40, wherein the treatment solution is regeneration through separation of the absorbed compound and removal of the natural gas introduced into the solution. The natural gas 93 is preferably supplied as fuel gas to an onboard power supply system 86 which might require recompression of the gas phase. The depleted treatment fluid is returned through pipeline 41 to the subsea system. Stream 49 is the removed compound or a part thereof.

To further explain the present invention the following example is provided. If the compound to be removed from the natural gas 11 is for instance water, the treatment fluid could be a glycol such as triethylene glycol. During transport of the rich glycol 45 including water together with the pressurized natural gas 59 through the riser 47, it is expected that part of the water will be transferred back to the gas phase. This water will be separated off together with the natural gas forming fuel gas 93. However, it is well known to combust fuel gas containing water, and this might even be beneficial for the control of the combustion temperature. When a significant amount of the compound to be removed, in this example water, is separated during transport and separated off through initial phase separation, the size of the further system to regenerate the treatment solution can be reduced. Other examples of treatment fluids and similar systems include absorbents of acidic compounds such as amine solutions for removing $CO_2$ and for $H_2S$.

Figure 5:
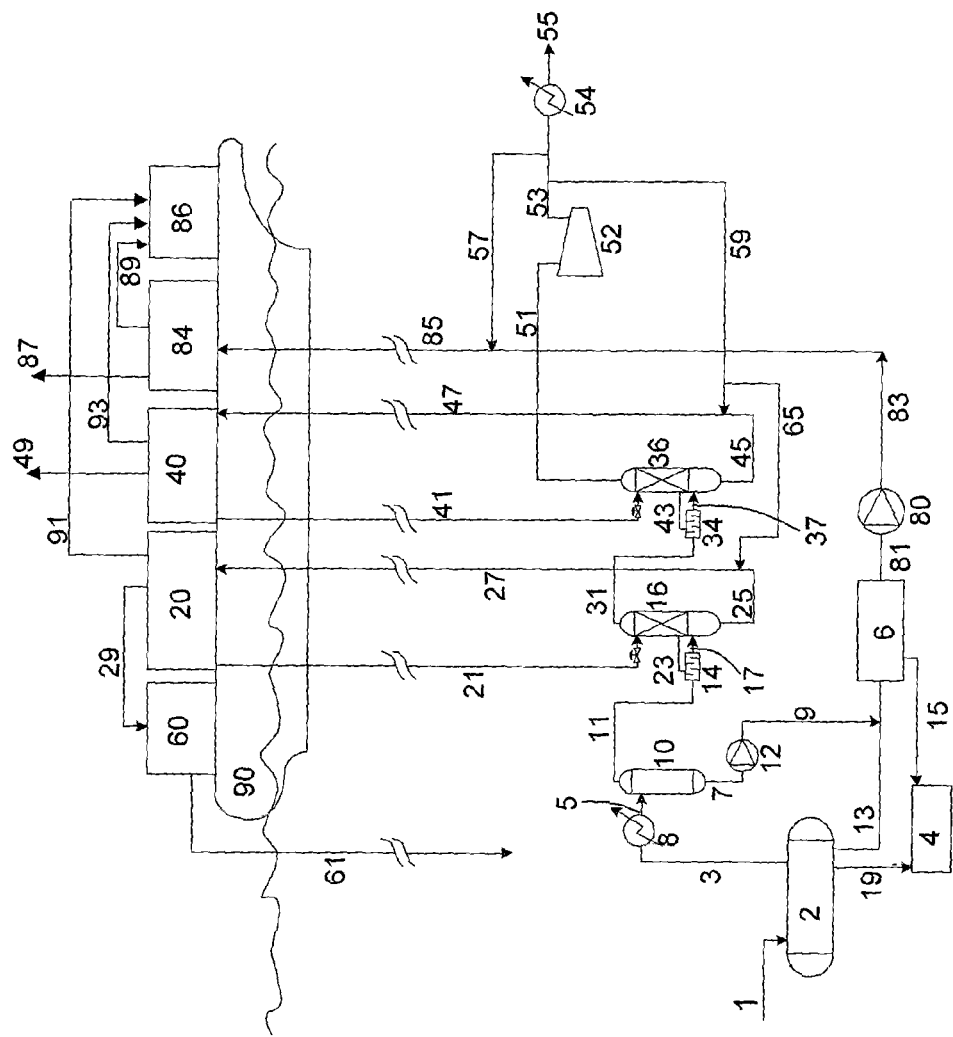
FIG. 5 schematically illustrates a further embodiment of the present invention with an alternative way of providing pressure to a treatment fluid or other liquid stream employed subsea where said stream needs to be transported to topside.

FIG. 5 illustrates a further embodiment of the present invention with an alternative way of providing pressure to a treatment fluid or other liquid stream employed subsea where said stream needs to be transported to topside. A well fluid 1 enters a phase separator 2, where a gas stream 3 is separated from the liquid. In the illustrated embodiment a water stream 19 is passed to a produced water treatment system 4, and the oil stream 13 is passed to an oil treatment system 6. The gas 3 is initially cooled by cooler 8 to obtain cooled gas 5. The cooling results in condensation of higher hydrocarbons which are separated in separator 10. The liquid stream 7 is via pump 12 and pipe 9 mixed with the main oil stream from the separator 2. The gas 11 leaving over the top of the separator 10 is subject to a gas treatment system. The crude gas stream 11 comprising a compound to be removed such as $CO_2$ and/or other acid gasses is fed to a contactor system 14, 16 arranged subsea. In the illustrated embodiment the contactor system is a two stage process with an initial direct contactor 14 and a traditional contactor column 16. However, the present invention is not limited to this embodiment; any contactor system applicable for subsea arrangement may be employed. In the direct contactor 14 the gas stream is brought in contact with a treatment solution stream fed through pipe 23. The obtained gas treatment solution mixture proceeds as stream 17 into the contactor column 16. Lean treatment solution is provided to the column from pipe 21. In the illustrated embodiment the treatment solution for the direct contactor 14 is obtained from the column 16 at a level above the gas inlet; however, the present invention is not limited to this solution, as lean treatment solution could also be fed to the direct contactor as well as the column. The treatment solution comprises one or more species that at least with some selectivity absorb the compound to be removed from the crude gas stream. A species and solvent/diluent applicable for forming an effective treatment solution can be selected by the user depending on the compound to be removed and the prevailing conditions within the system. During contact with the treatment solution the compound to be removed is absorbed in the solution. The crude gas accordingly at least partly depleted from the compound to be removed leaves over the top of the column through pipeline 31. The main crude gas stream accordingly stays subsea during the treatment process. The rich treatment solution leaves the contactor 16 through the bottom outlet pipeline 25. A pressurized natural gas stream 65 is added to the rich treatment solution to provide the necessary pressure to transport the rich treatment solution to the topside installation through riser 27.

On a topside facility 90 a regeneration system 20 is installed. The system receives the rich solution from pipeline 27, separates the added natural gas 91, and desorbs and separates the absorbed compound therefrom and obtains a depleted treatment solution which is sent back to the subsea contactor system through pipeline/riser 21. As discussed in connection with FIG. 4, a part of the absorbed compound may be released to the gas phase during transport through the riser 27. This released gas will follow the added natural gas via pipeline 91 and be added as fuel gas to the fuel gas system 86. The desorbed compound leaves the regeneration unit 20 as stream 29. If the compound is $CO_2$ the stream 29 may be treated and compressed in unit 60 and from there transported via pipeline 61 to a subsea injection well (not shown).

The obtained treated gas 31 enters a second system for removal of a second compound, such as water. The system comprises a direct contactor 34, where the gas is brought in contact with a treatment solution stream 43. The obtained mixture is fed to a contactor column 36. The rich treatment solution leaves via the bottom as stream 45 and is transported via pipeline 47 to a top side installation 90 and a regeneration unit 40. Pressurized hot natural gas 59 is added to the rich treatment solution subsea to facilitate the transport up through the riser 47. The topside system is as discussed in connection with FIG. 4. Topside, the added gas 93 and possibly some of the absorbed compound is obtained as fuel gas 93. The rest of the compound absorbed in the rich treatment solution is released, resulting in a compound stream 49 and a lean treatment solution 41 being returned to the subsea contactor 36. If the compound is water the stream 49 is steam that can be released to the atmosphere.

The treated gas stream 51 leaving over the top of contactor column 36 can be compressed in compressor 52 and the temperature of the compressed gas 53 controlled by heat exchanger 54, thereby providing a treated gas stream 55 adjusted for subsea pipeline transport.

Further illustrated on FIG. 5 is the handling of the oil stream 13, which is fed to an initial oil treatment system 6 arranged subsea. Here the crude oil is dehydrated, for instance by use of electrostatic coalescers or other dehydration techniques. Separated water is passed as stream 15 to the produced water treatment system 4. The dehydrated oil 81 is via pump 80 transferred to the topside installation 90 as stream 85 together with a part 57 of the treated and compressed gas 53. A topside stabilization system 84 comprises one or more stabilization steps where gas is flashed off from the crude oil. The first step is preferably performed at a pressure equal to the pressure required by the fuel gas system 86 so that the fuel gas 89 is not required to be compressed before feeding it to the fuel gas system 86. The fuel gas is a combination of the added gas 57 and the gas present in the crude oil prior to stabilization. Additional stabilization steps may be included within unit 84 to allow for removal of additional gas to secure a quality applicable for tanker transport. The amount of added gas 57 can be regulated based on the amount of fuel needed by the power generators and the fuel 91 and 93 being provided to the fuel gas system after having worked as a lift gas for the treatment solutions.

According to the present invention, as by way of example is illustrated in FIGS. 4 and 5, the amount of pumps required for transferring the treatment solutions from the subsea treatment units to the topside regeneration facilities has been limited and the pressurized natural gas added as lift gas serves as fuel for topside power generation.

The invention claimed is:

1. A crude natural gas treatment system for removal of a compound from a crude natural gas stream, the system comprising:
   an absorption unit which includes a natural gas inlet, a treatment solution inlet, a compound depleted gas outlet and a rich treatment solution outlet;
   a desorption unit which includes a rich treatment solution inlet, a compound outlet and a depleted treatment solution outlet;
   wherein the rich treatment solution outlet is in fluid communication with the rich treatment solution inlet and the depleted treatment solution outlet is in fluid communication with the treatment solution inlet;
   wherein the absorption unit is located subsea and the desorption unit is located topside; and
   a heat exchanger for heat exchanging the rich treatment solution with the depleted treatment solution;
   wherein the heat exchanger is a pipe-in-pipe riser through which the rich treatment solution and the depleted treatment solution are conveyed.

2. The system according to claim 1, wherein the pipe-in-pipe riser comprises an inner pipe in fluid communication with the depleted treatment solution outlet topside and the treatment solution inlet subsea, and an outer pipe in fluid communication with the rich treatment solution outlet subsea and the rich treatment solution inlet topside.

3. The system according to claim 1, wherein the absorption unit comprises at least one of an in-line mixing device and a contactor column.

4. A crude natural gas treatment system for removal of a compound from a crude natural gas stream, the system comprising:
   an absorption unit which includes a natural gas inlet, a treatment solution inlet, a compound depleted gas outlet and a rich treatment solution outlet; and
   a desorption unit which includes a rich treatment solution inlet, a compound outlet and a depleted treatment solution outlet;
   wherein the rich treatment solution outlet is in fluid communication with the rich treatment solution inlet and the depleted treatment solution outlet is in fluid communication with the treatment solution inlet;
   wherein the absorption unit is located subsea and the desorption unit is located topside;
   a second absorption unit which includes a second natural gas inlet, a second treatment solution inlet, a second compound depleted gas outlet and a second rich treatment solution outlet; and
   a second desorption unit which includes a second rich treatment solution inlet, a second compound outlet and a second depleted treatment solution outlet;
   wherein the second natural gas inlet is in fluid communication with the compound depleted gas outlet, the second rich treatment solution outlet is in fluid communication with the second rich treatment solution inlet, and the second depleted treatment solution outlet is in fluid communication with the second treatment solution inlet; and
   wherein the second absorption unit is located subsea and the second desorption unit is located topside.

5. The system according to claim 4, wherein the first compound is $CO_2$, the absorption unit is a $CO_2$ absorber, the second compound is $H_2O$ and the second absorber is a dehydrator.

* * * * *